United States Patent
Futamura

[15] 3,686,557
[45] Aug. 22, 1972

[54] FLOATING-TYPE ELECTRONIC SERVO-MOTOR PROCESS CONTROLLER

[72] Inventor: John Futamura, Hatboro, Pa.

[73] Assignee: Fischer & Porter Company, Warminster, Pa.

[22] Filed: Aug. 26, 1970

[21] Appl. No.: 67,021

[52] U.S. Cl. .................318/599, 318/610, 318/672, 318/678, 318/681, 323/19, 323/24, 323/25
[51] Int. Cl. ............................................G05b 11/28
[58] Field of Search......318/599, 609, 610, 678, 681, 318/672; 323/19, 24, 25

[56] References Cited

UNITED STATES PATENTS

| | | | |
|---|---|---|---|
| 3,551,770 | 12/1970 | Isaacs | 318/681 X |
| 3,181,046 | 4/1965 | Sutton | 318/599 X |
| 3,252,067 | 5/1966 | Devenbecher, Jr. | 318/678 X |
| 3,237,075 | 2/1966 | Sommeria | 318/681 X |
| 3,375,771 | 4/1968 | Balcom, Jr. | 318/681 X |
| 3,571,688 | 3/1971 | Tomasulo, Jr. | 318/681 X |
| 3,181,051 | 4/1965 | Marshall | 318/678 X |
| 3,204,113 | 8/1965 | Snygg | 318/599 X |
| 3,260,912 | 7/1966 | Gregory | 318/599 X |

Primary Examiner—T. E. Lynch
Attorney—Michael Ebert

[57] ABSTRACT

A floating-type electronic process controller including a differential amplifier which compares a voltage proportional to a process variable with a set point voltage to produce a deviation signal whose polarity and magnitude reflect the direction and extent of the departure of the process variable from the set point. The deviation signal is converted into on-off signals by applying it to a pair of comparator channels to which are also applied a triangular reference voltage having a constant frequency. When the deviation signal reflects a process variable which is below the set point, one channel is activated to yield square-wave pulses whose rate corresponds to the frequency of the reference voltage and whose pulse duration is proportional to the magnitude of the deviation signal, but when the deviation signal reflects a process variable which is above the set point, the other channel is activated to provide similar square-wave pulses. The square-wave pulses serve to trigger the triac control circuit of a reversible motor operatively coupled to a final control element, the pulses from one channel causing the motor to turn in one direction and the pulses from the other channel causing the motor to turn in the other direction, the duty cycle of the motor being determined by the duration of the pulses.

8 Claims, 7 Drawing Figures

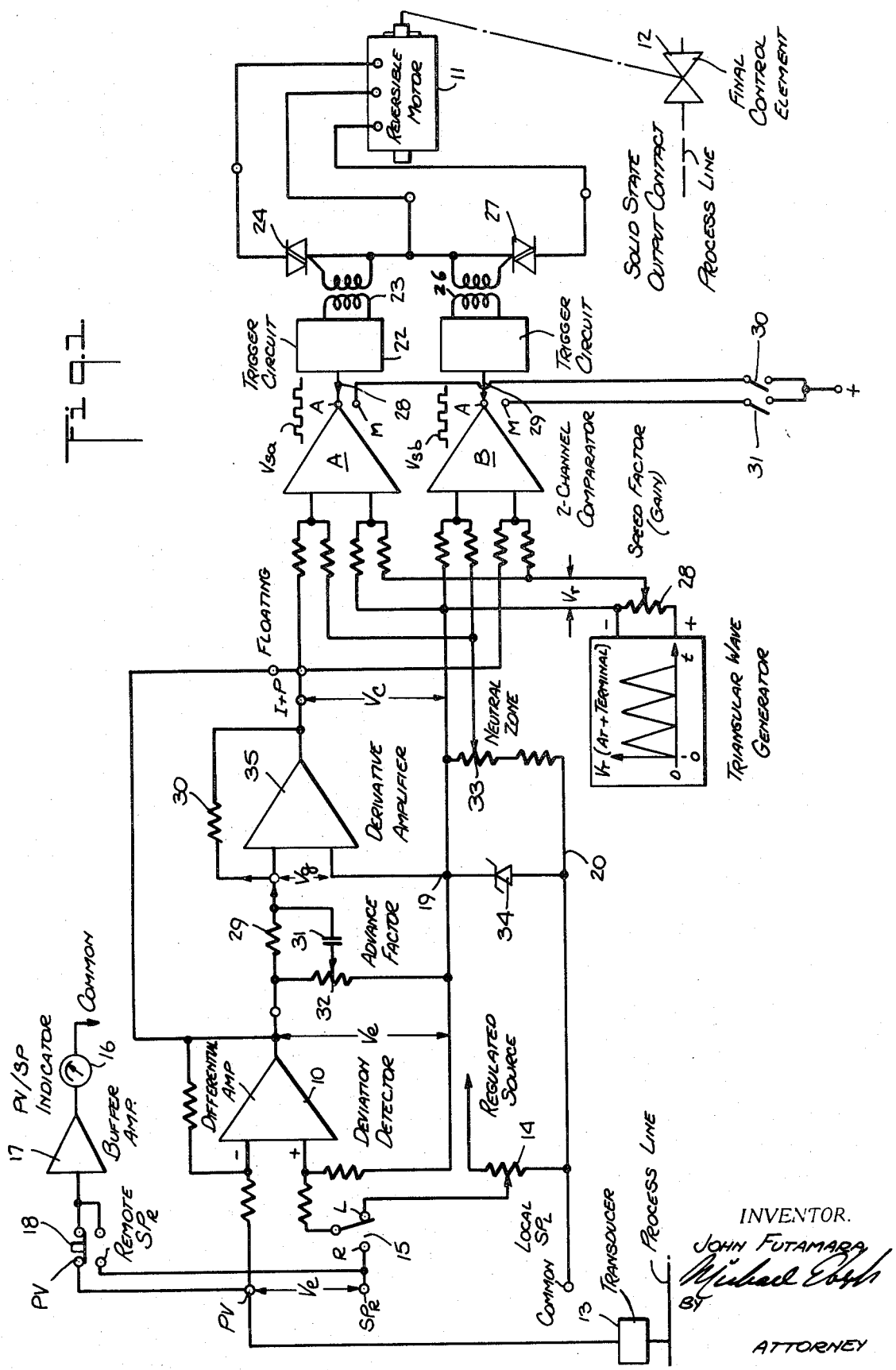

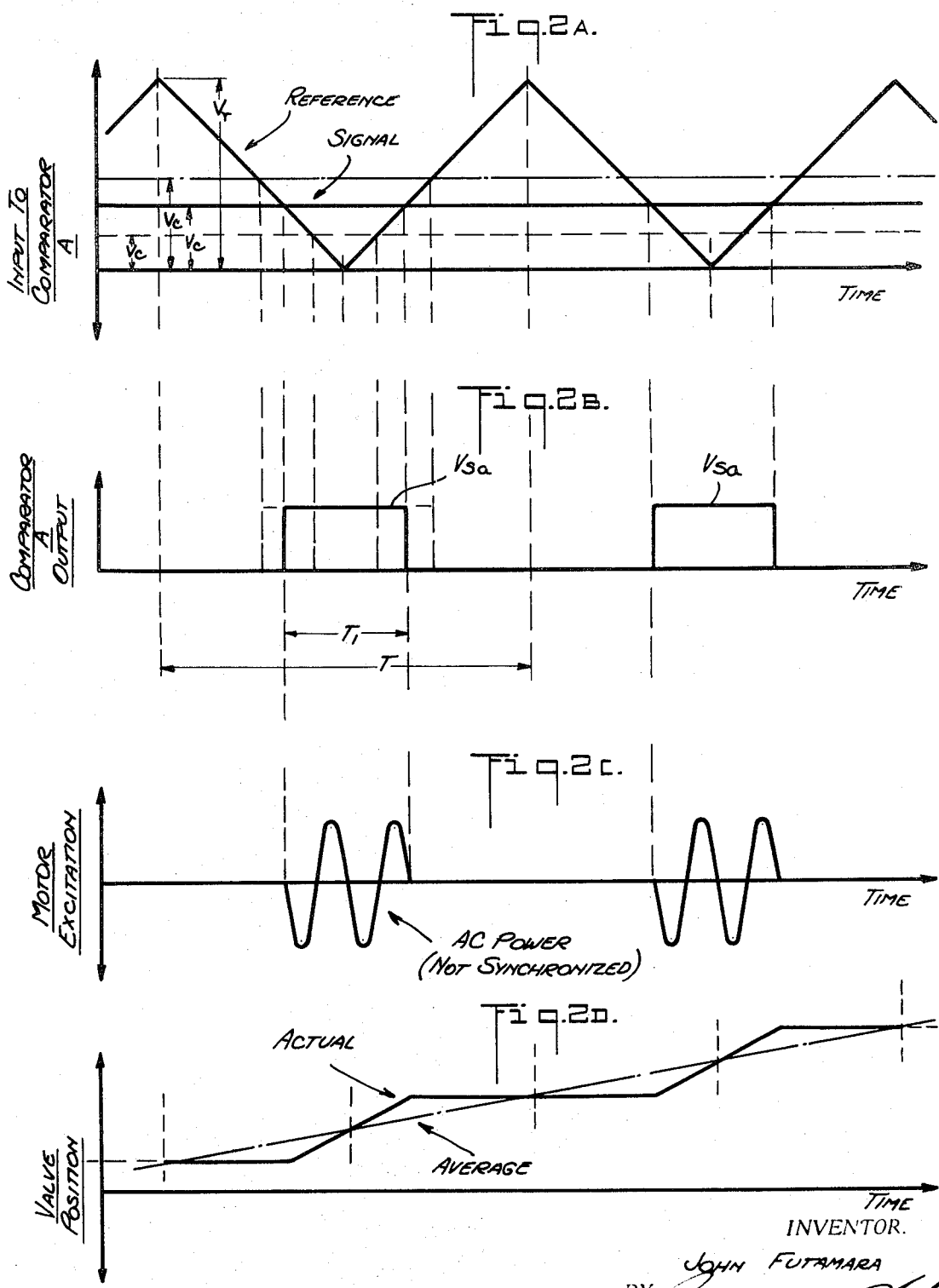

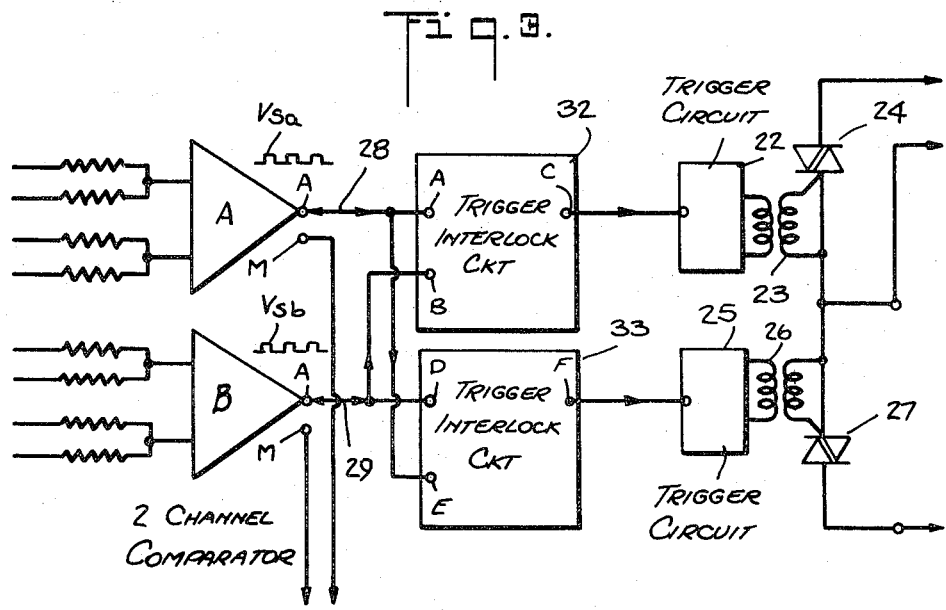
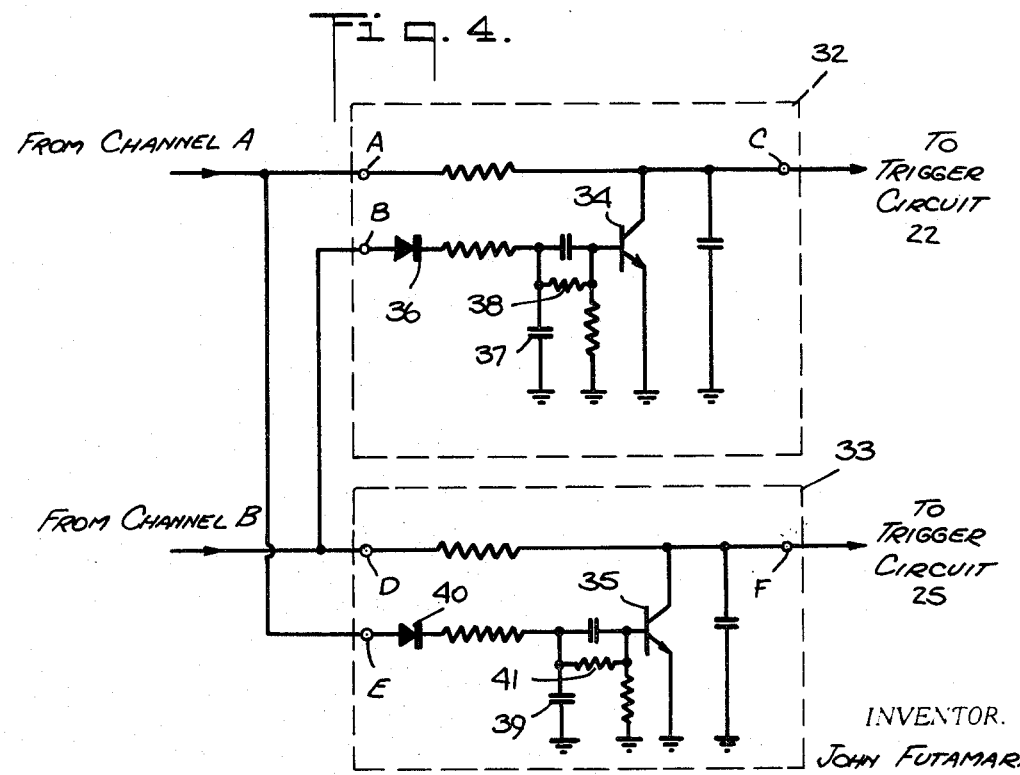

FLOATING-TYPE ELECTRONIC SERVO-MOTOR PROCESS CONTROLLER

BACKGROUND OF THE INVENTION

This invention relates generally to controllers for process control loops, and more particularly to a floating-type electronic controller adapted to accept to a process signal and to convert it to on-off signals for manipulating the speed and direction of a motor for a final control element without position feedback.

An electronic controller is a component in a process control loop which is subject to disturbances, the controller acting in conjunction with other devices to maintain a process variable at a desired value. To accomplish this purpose, the controller receives, in terms of electrical values, both the desired or set-point value and the process variable, the controller functioning to operate a final control element which directly or indirectly governs the process variable.

The factor controlled may be flow rate, pressure, viscosity, liquid level, or any other process variable. Thus the input signal of the controller may be derived from a rate-of-flow meter whose reading is translated into a corresponding electrical value. The output of the controller may be impressed on a flow-regulating valve, which valve is opened or closed or is caused to assume an intermediate position as determined by the controller. The specific nature of the process variable and the final control element is not the concern of the present invention, which is applicable to all forms thereof operable by a reversible motor.

The mode of control refers to the manner in which the process controller makes corrections relative to deviation. The present invention is concerned with controllers operating in the floating mode wherein a predetermined relation exists between the deviation and the rate of travel of the final control element. The final control element moves toward either one or the other of its two extreme positions, depending on whether the process variable is above or below the set point.

In the single-speed floating mode, the final control element moves at a single rate regardless of the amount of deviation. Thus an on-off contact controller can produce a single-speed floating mode if used with a slow-running reversible electric-motor-driven valve. When the process variable is above the set point, the valve will run toward its closed position at a single speed, but when the process variable is below the set point, the valve will run toward its open position at the same speed.

The single-speed floating mode of control is of little practical use, for it produces continuous cycling. In actual practice, single-speed floating control is used in a two-contact controller with a neutral zone operating in conjunction with a relatively slow reversible motor. When the value of the process variable is in the neutral zone between the contact settings, no contact is made and the valve remains motionless. This mode makes it possible for the contact system to produce an almost exact correction for any load condition and, if properly adjusted, it can eliminate valve motion except when correcting for load or set point changes.

In the proportional-speed floating mode, the rate of travel of the final control element is changed at a rate proportional to deviation, so that the greater the deviation from the set point, the faster the valve moves. The direction of travel of the valve is dependent upon the direction of deviation, and the control continues to operate until the deviation returns to zero without any offset. This is the unique advantage of floating mode over any other mode.

While it has been known to operate an electronic controller in the proportional-speed floating mode such as in the arrangement disclosed in the U.S. Pat. No. 3,262,034, such controllers entail floating rate feedback circuits with adjustable gain to effect the required mode of operation. A system of this type is relatively complex and costly.

SUMMARY OF THE INVENTION

In view of the foregoing, it is the main object of this invention to provide a contact output electronic controller which accepts a process signal and converts it to on-off signals to manipulate a reversible motor for controlling a final control element without position feedback.

More specifically, it is an object of the invention to provide a floating-type electronic process controller having an adjustable gain and a stable dead band.

Also an object of the invention is to provide an electronic controller operating in conjunction with a reversible motor, the control circuit for the motor including a pair of triacs which are switched into operation by on-off signals derived from the controller, whereby the activation of one triac causes the motor to turn in one direction, and the activation of the other triac causes the motor to turn in the reverse direction.

A salient feature of the invention is an interlock system to prevent simultaneous activation of the triacs.

Among the significant advantages of the invention are that no final control element valve position transmitter is required, for the system requires no position feedback, and that the valve position is maintained should power fail.

Briefly stated, these objects are attained in a contact-output-type electronic controller which includes a differential amplifier adapted to sense the deviation of the process variable from the set point to produce a deviation signal. This is converted into on-off signals by applying the deviation signal to a pair of comparator channels to which are also applied a triangular wave reference voltage having a constant frequency. When the process variable is below the set point, one channel is activated to yield square-wave pulses whose rate corresponds to the reference frequency and whose duration is proportional to the magnitude of the deviation signal and hence to the extent to which the process variable deviates from the set point. When the deviation signal reflects a process variable which is above the set point, the other channel is activated to provide similar square-wave pulses.

The square-wave pulses produced by the channels are applied to the triac control circuit of a reversible motor operatively coupled to a final control element. The pulses from one channel effect motor operation in one direction with a duty cycle determined by the pulse duration, and the pulses from the other channel similarly effect motor operation in the reverse direction whereby the final control element varies the process variable in a direction and to an extent bringing it into line with the set point.

OUTLINE OF THE DRAWING

For a better understanding of the invention, as well as other objects and further features thereof, reference is made to the following detailed description to be read in conjunction with the accompanying drawing, wherein:

FIG. 1 is a simplified schematic diagram of an electronic controller in accordance with the invention;

FIG. 2A is a graph illustrating the relationship of the deviation signal in one comparator channel of the controller with the triangular reference voltage applied thereto;

FIG. 2B shows the square-wave pulse output of the controller;

FIG. 2C illustrates the power pulses applied to the final control element motor in response to the comparator output.

FIG. 2D shows the valve position of the final control element as a result of the motor excitation;

FIG. 3 shows a modification of FIG. 1 wherein trigger interlock circuits are added to the controller system, the circuits being shown in blockform; and FIG. 4 is a schematic circuit diagram of the trigger interlock circuits.

DESCRIPTION OF THE INVENTION

Referring now to FIG. 1, there is shown a floating-type electronic process controller in accordance with the invention. The controller, which includes a main amplifier 10, receives in terms of electrical analog values, both a voltage which is a function of the process variable and a set point voltage, the controller functioning to operate, by way of a reversible electric motor 11, a final control element 12 which governs the process.

Main amplifier 10 is a differential amplifier preferably in the form of a two-stage solid-state module. Applied to the negative input terminal thereof is an electrical signal (i.e., one to five volts DC) derived from a transducer 13 or other means, which signal is proportional to the process variable PV being sensed. Applied to the positive input terminal of main amplifier 10 is a local set point signal $SP_L$ or a remote set point signal $SP_R$. The local set point signal is derived from a potentiometer 14 connected to a regulated voltage source. A selector switch 15 serves to apply either the remote or the local set point signal to the positive input of the main amplifier by way of contacts R and L.

Meter 16 serves to indicate (a) process variable PV or (b) the remote set point $SP_R$ if push-button 18 is depressed. Meter is is connected through a buffer amplifier 17 to either the PV or $SP_R$ terminals, as selected by push-button selector switch 18. The output $V_e$ ($\pm 4$ volts) of the main amplifier is a function of the deviation between the set point and process variable input values with reference to a floating reference level established at terminal 19 relative to the base line 20 which is common to all applied voltages. The amplifier 10 acts as a deviation detector which senses the departure of the process variable from the set point. This deviation voltage is converted into an on-off signal by a two-channel comparator constituted by channel stages A and B operating in conjunction with a triangular-wave reference generator 21.

When the process variable deviates in a given direction from the set point to produce a control voltage $V_c$, this voltage is applied to both comparator channels in combination with the triangular-wave reference voltage $V_r$, thereby activating comparator channel A to produce square-wave output pulses $V_{sa}$ at a rate determined by the frequency of the triangular-wave reference voltage $V_r$, the duration of the square-wave pulses being a function of the magnitude of the control voltage $V_c$.

Similarly, when the process variable deviates from the set point in the reverse direction, comparator channel B is activated to produce square-wave output pulses $V_{sb}$ whose duration is a function of the magnitude of control voltage $V_c$. The amplitude of triangular-wave reference voltage $V_r$ is adjustable by means of potentiometer 28, which controls the gain or speed factor of the controller. Additionally, the frequency of the triangular wave generator may be changed to effect a different repetition rate.

Square-wave pulses $V_{sa}$ from channel A are fed to a trigger oscillator circuit 22 which is coupled by a transformer 23 to a triac 24 which is arranged to control the supply of AC power to reversible motor 11 to cause the motor to turn in one direction and to thereby open (or close) the final control element. In practice, the AC power controlled by the triacs may be rectified so as to manipulate a DC motor valve generator.

Square-wave pulses $V_{sb}$ from channel B are fed to a trigger oscillator circuit 25 which is coupled by a transformer 26 to a triac 27 arranged to control the supply of AC power to motor 11 to cause it to turn in the opposite direction and to thereby close (or open) the final control element. Triacs are three-terminal semiconductor switches for AC power which may be triggered into conduction in either direction by a gate current in either polarity.

It will be seen therefore that motor 11 is supplied with periodic pulses of AC power, the periodicity of which is determined by the frequency of the triangular-wave reference voltage $V_r$. These power pulses are modulated in width as a function of the detected deviation in the process variable. Thus the duty cycle of the motor varies as a function of the deviation; the greater the deviation, the longer the power pulses.

Integral gain depends not only on the controller but also on stroke speed of the valve and is expressed by the following equation:

$$\text{Integral gain} = \frac{\text{speed factor of controller}}{\text{full stroke travel time (sec) of valve}}$$

The speed factor may be expressed by the following equation:

$$\text{Speed factor} = \frac{100}{\text{deviation \% required for max. motor speed}}$$

A form of proportional action is added to the control algorithm by supplying thereto a signal proportional to the derivative of the deviation. For this purpose, the voltage $V_c$, which is fed to the comparator channels, is derived from the output of a high-gain derivative amplifier 35 which operates in conjunction with fixed resistors 29 and 30, a capacitor 31 and a potentiometer 32.

The effect of the derivative amplifier is to advance the valve position change for a given input change, thereby giving excess travel to the valve at the beginning of the valve movement. The speed advance factor, which is controllable by potentiometer 32, is defined as the time required by the valve, driven by integral action only, to travel for the same distance that is caused from advance or proportional action for a given step deviation input.

Also applied to the inputs of comparator channels A and B is a voltage derived from potentiometer 33, which voltage is stabilized by zener diode 34. This voltage provide a neutral zone, so that by varying potentiometer 33, one may adjust the amount of steady-state deviation between PV and SP before control action will take place.

Referring now to FIG. 2A, the relationship between the input or deviation voltage $V_c$ applied to comparator and triangular-wave reference voltage $V_r$, also applied thereto, is illustrated. The amplitude of voltage $V_c$ is shown at three different levels, indicated respectively by dashed, solid and broken lines.

The resultant output voltage $V_{sa}$ of comparator A is shown in FIG. 2B, and it will be seen that each pulse of voltage $V_{sa}$ has a leading edge coincident in time to the point of intersection between $V_c$ and one sloping side of triangular voltage $V_r$ and a trailing edge coincident with the point of intersection between voltage $V_c$ and the other side of voltage $V_r$. Hence the amplitude of voltage $V_{sa}$ remains constant but the duration thereof in a function of the amplitude of voltage $V_r$ and $V_c$.

Since triac 24 is rendered conductive as long as voltage $V_{sa}$ is present, AC power is applied to motor 11, as shown in FIG. 2C, for an interval corresponding to the duration of $V_{sa}$. The valve position resulting from the intermittent operation of the motor is changed as shown in FIG. 2D, the average level also being indicated, this being obtained in the graph by connecting valve positions corresponding to the time when the triangular-wave reference voltage is at the peaks and troughs.

To provide for manual as well as automatic operation, the output of channel A is applied to trigger circuit 22 through a selector switch 28 having two fixed contacts A and M, contact A being the automatic position and contact M the manual position. The output of channel B is likewise applied to trigger circuit 25 through a selector switch 29. The M contact of switch 28 is connected to the positive terminal of a voltage source through a push-bottom switch 30 and the M contact of switch 29 is connected to this positive terminal through a push-button switch 31. Thus when the selector switches are on "manual," by pressing push-button switch 30 or 31, one may cause the motor to turn in a desired direction to open or close valve 12.

As is well known, a triac does not cease conduction until its current falls below the minimum holding current value. Cessation of conduction may therefore occur even after the trigger circuit associated therewith has stopped oscillating. This happens because the phase of the trigger oscillator and the phase of the supply voltage are not synchronized and because of the lagged phase of the motor current. In the event the triac associated with one channel is still on when conduction of the triac associated with the other channel has commenced, both triacs will then be concurrently conductive, as a consequence of which the external circuit including the power sources will be short-circuited. This could be very troublesome.

In order, therefore, to prevent the trigger oscillator in the second channel from starting to oscillate when the triac in the first channel is still conductive, the system shown in FIG. 1 is provided with interlock switches. Such interlock switches are electrical in nature, and are illustrated in FIG. 3 where it will be seen that the output of channel A is coupled to input terminal A of the interlock circuit 32 whose output terminal C is connected to trigger oscillator circuit 22, whereas the output of channel B is connected to input terminal D of an interlock circuit 33 whose output terminal F is connected to trigger oscillator circuit 25.

Interlock circuit 32 for channel A feeding triac 24 is provided with a control terminal B which is connected to the output of channel B to effect locking of channel A as long as channel B is supplying a signal to operate its associated triac 27. Similarly interlock switch 33 for channel B feeding triac 27 provided with a control terminal E connected to the output of channel A to effect locking of channel B as long as channel A is supplying a signal to operate its associated triac 24.

The manner in which these interlocking actions are carried out will now be described in connection with FIG. 4 which shows the interlock circuits 32 and 33. Interlock circuit 32 includes a transistor 34 and interlock circuit 33 includes a transistor 35. These transistors are arranged so that when their collector-to-emitter paths are rendered conductive, they act to short-circuit the signal coming form the channel associated therewith, thereby de-activating the related trigger oscillator.

Transistor 34 is rendered conductive by a voltage applied to the base thereof by a memory capacitor 37 which is quickly charged through a unidirectional diode 36 connected to control terminal B of interlock circuit 32. This charging voltage is derived from the pulses in the output of channel B. When transistor 34 is rendered conductive, it short-circuits the output of channel A and thereby prevents operation of trigger circuit 22 associated with triac 24.

The charge in capacitor 37 is discharged at a relatively slow rate through resistor 38. Hence even after channel B ceases to provide an output, interlock circuit 32 prevents operation of the triac in channel A for a predetermined interval determined by the time constants of the interlock circuit.

Interlock circuit 33 operates in the same fashion and includes a memory capacitor 39 which is charged rapidly through diode 40 going to control terminal E connected to the output of channel A, the capacitor discharging more slowly through resistor 41. It will be seen that the interlock circuits operate in both the automatic and manual mode, for when selector switches 28 and 29 are on M, then the interlock switches will prevent both triacs from simultaneously operating should one close both push-button switches 30 and 31 at the same time.

While there has been shown and described a preferred embodiment of floating-type electronic process controller, it will be appreciated that many changes and modifications may be made therein without, however, departing from the spirit of the invention.

I claim:
1. A floating-type electronic process controller adapted to accept a process variable signal and to convert it to on-off signals for controlling the speed and direction of a reversible motor operatively coupled to a final control element which governs the process, said controller comprising:
   A. a differential amplifier responsive to the departure of the process variable signal from a set point to produce a deviation signal whose magnitude and polarity depend on the extent and direction of the departure from the set point,
   B. a pair of comparator channels,
   C. a triangular-wave generator producing a reference voltage having a predetermined frequency,
   D. first means coupled both to said differential amplifier producing said deviation signal and to said generator producing said reference voltage to apply the deviation signal and said reference voltage to one of said comparator channels to produce first square-wave pulses whose rate corresponds to the predetermined frequency of said reference voltage and whose duration is proportional to the degree that said deviation signal reflects a process variable which is above said set point,
   E. second means also coupled both to said differential amplifier and to said generator to apply the deviation signal and said reference voltage to the other of said comparator channels to produce second square-wave pulses at the same rate and with a duration proportional to the degree that said deviation signal reflects a process variable which is below said set point;
   F. a control circuit for said reversible motor coupled to said channels and responsive to said first and second square-wave pulses to effect intermittent operation of said motor in a direction determined by which pulses are present, and
   G. a derivative amplifier interposed between said differential amplifier and said first and second means to provide for action in the proportional mode.

2. A controller as set forth in claim 1, further including selective switching means which in one position effects operation of said motor automatically by said pulses, and in a second position provides for manual operation.

3. A controller as set forth in claim 1, further including means to adjust the frequency of said triangular-wave generator.

4. A controller as set forth in claim 1, further including means to adjust the amplitude of said reference voltage.

5. A controller as set forth in claim 1, further including means to apply a neutral zone voltage to said comparator channels.

6. A controller as set forth in claim 1, wherein said channels are constituted by differential amplifiers responsive to both said deviation signal and said reference voltage.

7. A controller as set forth in claim 1, wherein said motor control circuit includes a pair of triacs responsive to said first and second square-wave pulses respectively.

8. A controller as set forth in claim 1, further including a meter to indicate the value of said process variable or said remote set point and a selector switch to apply either value to said meter.

* * * * *